United States Patent
Li et al.

(10) Patent No.: US 11,425,327 B2
(45) Date of Patent: *Aug. 23, 2022

(54) SYSTEMS AND METHODS FOR IDENTIFYING FORMALITY STANDARD

(71) Applicant: ZHEJIANG XINSHENG ELECTRONIC TECHNOLOGY CO., LTD., Zhejiang (CN)

(72) Inventors: Haoran Li, Hangzhou (CN); Genqiang Cui, Hangzhou (CN); Bingyun Lyu, Hangzhou (CN)

(73) Assignee: ZHEJIANG XINSHENG ELECTRONIC TECHNOLOGY CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/243,610

(22) Filed: Apr. 29, 2021

(65) Prior Publication Data

US 2021/0250541 A1 Aug. 12, 2021

Related U.S. Application Data

(63) Continuation of application No. 16/569,656, filed on Sep. 12, 2019, now Pat. No. 11,039,101, which is a
(Continued)

(30) Foreign Application Priority Data

Mar. 17, 2017 (CN) .......................... 201710160586.1

(51) Int. Cl.
*H04N 5/46* (2006.01)
*H04N 5/05* (2006.01)
(Continued)

(52) U.S. Cl.
CPC ................ *H04N 5/46* (2013.01); *H04N 5/05* (2013.01); *H04N 7/01* (2013.01); *H04N 17/004* (2013.01)

(58) Field of Classification Search
CPC ........ H04N 17/00; H04N 17/004; H04N 5/04; H04N 5/05; H04N 5/46; H04N 5/4401; H04N 7/01; H04N 7/083; H04N 9/642
(Continued)

(56) References Cited

U.S. PATENT DOCUMENTS 5,761,211 A 6/1998 Yamaguchi et al.
7,733,426 B2 6/2010 Lee et al.
(Continued)

FOREIGN PATENT DOCUMENTS

CN 101505387 A 8/2009
CN 101640790 A 2/2010
(Continued)

OTHER PUBLICATIONS

International Search Report in PCT/CN2017/119704 dated Mar. 21, 2018, 4 pages.
(Continued)

*Primary Examiner* — Sherrie Hsia
(74) *Attorney, Agent, or Firm* — Metis IP LLC

(57) ABSTRACT

The present disclosure relates to a system and method. The system includes: a storage device storing a set of instructions; and one or more processors in communication with the storage device. When executing the set of instructions, the one or more video processors: synchronize a signal with a first PN sequence, wherein the signal includes a plurality of second PN sequences, marked as 0 PN sequence, 1 PN sequence, . . . , (k−1) PN sequence, k sequence, wherein k is a positive integer number; determine that the signal is synchronized with the first PN sequence; determine a first
(Continued)

target distance between the (k−1) PN sequence and the k sequence; and determine a formality standard of the signal based on the first target distance.

20 Claims, 6 Drawing Sheets

Related U.S. Application Data continuation of application No. PCT/CN2017/119704, filed on Dec. 29, 2017.

(51) Int. Cl.
*H04N 7/01* (2006.01)
*H04N 17/00* (2006.01)

(58) Field of Classification Search
USPC ............... 348/554, 476–486, 500, 464, 462; 375/240.28, 354, 355
See application file for complete search history.

(56) References Cited

U.S. PATENT DOCUMENTS

2005/0206787 A1   9/2005   Lee
2008/0240307 A1   10/2008  Wang et al.
2019/0174027 A1   6/2019   Lv

FOREIGN PATENT DOCUMENTS

| CN | 101989969 A | 3/2011 |
| CN | 102595183 A | 7/2012 |
| CN | 102740086 A | 10/2012 |
| CN | 101510975 B | 10/2014 |
| CN | 104486778 A | 4/2015 |
| CN | 104796366 A | 7/2015 |
| KR | 20100071810 A | 6/2010 |
| KR | 20110010020 A | 1/2011 |
| TW | 201116071 A | 5/2011 |
| WO | 2018166277 A1 | 9/2018 |

OTHER PUBLICATIONS

Written Opinion in PCT/CN2017/119704 dated Mar. 21, 2018, 5 pages.
The Second Office Action in Chinese Application No. 201710160586.1 dated Aug. 21, 2018, 13 pages.
Yan, Changxue et al., Autodistinguish and Autotransform of the Multi-System Colour Television, Journal of South-Central College for Nationalities (Nat. Sci.), 16(2): 39-43, 1997.
The Extended European Search Report in European Application No. 17900558.2 dated Nov. 28, 2019, 9 pages.
J. D. Wang et al., Training Signal and Receiver Design for Multi-path Channel Characterization for TV Broadcasting, IEEE Transactions on Consumer Electronics, 36(4): 794-806, 1990.
R. Lancini et al., A Robust Video Watermarking Technique for Compression and Transcoding Processing, IEEE International Conference on Multimedia and Expo, 2002, 4 pages.
Wang, Xianbin et al., Transmitter Identification Using Embedded Pseudo Random Sequences, IEEE Transactions on Broadcasting, 50(3): 244-252, 2004.

700

```
┌─────────────────────────────────────────────────────┐
│ Performing cross correlation accumulation on a      │
│ signal and a local PN sequence, and obtaining a     │
│ plurality of correlation values, wherein the        │──── 701
│ signal includes a plurality of PN sequences,        │
│ marked as 0 PN sequence, 1 PN sequence, ...,        │
│ (k-1) PN sequence, k PN sequence                    │
└─────────────────────────────────────────────────────┘
                         │
                         ▼
┌─────────────────────────────────────────────────────┐
│ Dividing the plurality of correlation values        │
│ using a plurality of windows, and for each of the   │
│ plurality of windows, determining the maximum       │──── 702
│ correlation value and a position corresponding to   │
│ the maximum correlation value                       │
└─────────────────────────────────────────────────────┘
                         │
                         ▼
┌─────────────────────────────────────────────────────┐
│ If relative positions corresponding to the maximum  │
│ correlation values of K successive windows are      │
│ identical, determining that the signal is           │──── 703
│ synchronized with the local PN sequence, and        │
│ determining the maximum correlation value of the    │
│ (k-1) PN sequence and a relative position thereof   │
└─────────────────────────────────────────────────────┘
                         │
                         ▼
┌─────────────────────────────────────────────────────┐
│ If a correlation value of the k PN sequence is      │
│ within a range, determining the correlation value   │
│ as the maximum correlation value of the k PN        │──── 704
│ sequence, and determining the relative position of  │
│ the maximum correlation value of the k PN sequence  │
└─────────────────────────────────────────────────────┘
                         │
                         ▼
┌─────────────────────────────────────────────────────┐
│ Determining a target distance between the (k-1) PN  │──── 705
│ sequence and the k PN sequence                      │
└─────────────────────────────────────────────────────┘
                         │
                         ▼
┌─────────────────────────────────────────────────────┐
│ Determining a formality standard of the signal      │──── 706
│ based on the target distance                        │
└─────────────────────────────────────────────────────┘
```

FIG. 7

SYSTEMS AND METHODS FOR IDENTIFYING FORMALITY STANDARD

CROSS-REFERENCE TO RELATED APPLICATION

This application is a continuation of U.S. application Ser. No. 16/569,656 filed on Sep. 12, 2019, which is a continuation of International Application No. PCT/CN2017/119704, filed on Dec. 29, 2017, which claims priority of Chinese Application No. CN201710160586.1, filed on Mar. 17, 2017. Each of the above-referenced applications is hereby incorporated by reference in their entireties.

TECHNICAL FIELD

The present disclosure generally relates to systems and methods for identifying a formality standard, and in particular, to systems and methods for identifying a formality standard associated with PN sequences.

BACKGROUND

There are three main formality standards for Composite Video Broadcast Signals (CVBS): NTSC, PAL and SECAM, which are not compatible with each other.

NTSC (National Television System Committee) standard, also known as quadrature balance modulation, is firstly developed and used by the United States. Thus, it is also known as the United States standard. Japan, Canada, etc. also use this formality standard. The NTSC standard is the first compatible color TV standard that is successfully applied to television broadcast. The NTSC standard uses a brightness signal and two color difference signals, modulates the two color difference signals onto a color subcarrier using quadrature balance amplitude modulation, and transmits the two color difference signals inserted in the gap of the brightness signal simultaneously using the spectral interval technology. The frame rate is 29.97 frames per second, the number of scan lines is 525, interlaced scanning, the screen ratio of 4:3, the resolution of 720×480. The main drawback of the NTSC standard is the poor color stability, which is sensitive to phase distortion. Nevertheless, the NTSC standard made a huge contribution to the development of color TV and laid a very important foundation for other standards.

PAL (Phase Alternation Line) standard, also known as progressive inverted quadrature amplitude modulation standard, referred to as progressive inverted standard, is developed and used by the former Federal Republic of Germany, which is also known as West Germany standard. The United Kingdom, Australia and China use this standard. While the black and white standards are different, West Germany uses PAL-B/G system, China uses PAL-D standard. The PAL standard is an improvement on the NTSC standard, its signal processing is basically the same as the NTSC standard, while one of the two color difference is modified to overcome phase distortion sensitivity of the NTSC standard. The frame rate is 25 frames per second, the number of scan lines is 625, interlaced scanning, the screen ratio of 4:3, the resolution of 720×576.

The SECAM standard, also known as progressive rotation, storage, transmission of FM color standard, referred to as FM, overcomes color changeable disadvantages of the NTSC standard from another way. The French first developed the SECAM standard successfully, so also called as France standard. The former Soviet Union and Eastern European countries uses this standard. In the SECAM standard, two color difference signals are used to modulate and transmit two subcarriers in turn, i.e., each line transmits only one color difference component, thus overcoming the crosstalk between signals. Since each line only transmits a color difference signal, the subcarrier is modulated by only one color difference signal at any time, it is not necessary to perform quadrature balance amplitude modulation as the NTSC standard does. The frame rate is 25 frames per second, the number of scan lines is 625, interlaced scanning, the screen ratio is 4:3, the resolution of 720×576.

For an image system, the system configuration is changed according to different formality standards. Usually, the image processing apparatus of the image system may store the system configuration corresponding to the formality standard of an input video in its memory in advance. When the image system is working, the CPU may read the system configuration from the memory and set system modules according to the system configuration, then the system module begin to work properly.

The system configuration is set based on the formality standard of an input video. Once the formality standard changes, the system cannot work properly using the original system configuration. Accordingly, the image system may change the system configuration to suit the new formality standard, which makes the image system work properly. The usual operation is to change the memory. Then the image system reads the new system configuration corresponding to the new formality standard from the new memory, changes the system settings, and works normally. Obviously, the operation is quite inconvenient.

The number of formality standards for a CVBS signal is great. Therefore, identifying formality standards automatically in the CVBS decoding device is very important. There are several methods for identifying formality standards described as below:

1) For each formality standard, design a PN (Pseudorandom Noise) sequence, and determine the current formality standard by detecting characteristics of the PN sequence. Different PN sequences are designed to correspond to different formality standards, which is resource-consuming in the actual implementation process.

2) Compare the variance character of a signal using wavelet processing with a default threshold, and determine the current formality standard based on the comparison. However, the calculation amount of the wavelet processing is great.

SUMMARY

According to an aspect of the present disclosure, a system may include a storage device storing a set of instructions; and one or more processors in communication with the storage device. When executing the set of instructions, the one or more processors synchronize a signal with a first PN sequence, wherein the signal includes a plurality of second PN sequences, marked as 0 PN sequence, 1 PN sequence, . . . , (k−1) PN sequence, k sequence, wherein k is a positive integer number; determine that the signal is synchronized with the first PN sequence; determine a first target distance between the (k−1) PN sequence and the k sequence; and determine a formality standard of the signal based on the first target distance.

In some embodiments, every two successive second PN sequences of the 0 PN sequence, the 1 PN sequence, . . . , the (k−1) PN sequence may be equidistant.

In some embodiments, to determine the first target distance, the one or more processors may determine a first position corresponding to a first maximum correlation value of the (k−1) PN sequence; determine a second position corresponding to a second maximum correlation value of the k PN sequence; and determine a distance between the first position and the second position as the first target distance.

In some embodiments, to determine the second position corresponding to the second maximum correlation value of the k PN sequence, the one or more processors may determine whether the second maximum correlation value is within a range, wherein the range is determined based on maximum correlation values of the 0 PN sequence, the 1 PN sequence, . . . , and the (k−1) PN sequence.

In some embodiments, to determine the formality standard of the signal based on the first target distance, the one or more processors may determine the formality standard of the signal based on the distance between the first position and the second position.

In some embodiments, to synchronize the signal with the first PN sequence, the one or more processors may perform cross correlation accumulation on the signal and the first PN sequence; and obtain a plurality of correlation values of the 0 PN sequence, the 1 PN sequence, . . . , and the (k−1) PN sequence.

In some embodiments, to determine that the signal is synchronized with the first PN sequence, the one or more processors may determine that relative positions corresponding to maximum correlation values of at least two successive second PN sequences of the 0 PN sequence, the 1 PN sequence, . . . , and the (k−1) PN sequence are identical.

In some embodiments, to determine that relative positions corresponding to maximum correlation values of at least two successive second PN sequences of the 0 PN sequence, the 1 PN sequence, . . . , and the (k−1) PN sequence are identical, the one or more processors may divide correlation values of the 0 PN sequence, the 1 PN sequence, . . . , and the (k−1) PN sequence using a plurality of windows; for each of the plurality of windows, determine a third maximum correlation value, and determine a relative position corresponding to the third maximum correlation value; and determine that the relative positions corresponding to the third maximum correlation values are identical.

In some embodiments, the length of each of the plurality of windows may be determined based on a second target distance between two successive second PN sequences of the 0 PN sequence, the 1 PN sequence, . . . , and the (k−1) PN sequence.

In some embodiments, the one or more processors may determine that differences between third maximum correlation values are less than a threshold.

According to an aspect of the present disclosure, a method implemented on a computing device having at least one processor, at least one computer-readable storage medium, and a communication platform connected to a network may include: synchronizing a signal with a first PN sequence, wherein the signal includes a plurality of second PN sequences, marked as 0 PN sequence, 1 PN sequence, . . . , (k−1) PN sequence, k sequence, wherein k is a positive integer number; determining that the signal is synchronized with the first PN sequence; determining a first target distance between the (k−1) PN sequence and the k sequence; and determining a formality standard of the signal based on the first target distance.

According to an aspect of the present disclosure, a system may include a storage device storing a set of instructions; and one or more processors in communication with the storage device. When executing the set of instructions, the one or more processors superpose a standard beacon on a blanking line of a signal, the standard beacon including a plurality of PN sequences, marked as 0 PN sequence, 1 PN sequence, . . . , (k−1) PN sequence, k sequence, wherein k is a positive integer number, wherein every two successive PN sequences of the 0 PN sequence, the 1 PN sequence, . . . , the (k−1) PN sequence are equidistant, wherein a target distance between the (k−1) PN sequence and the k sequence is determined based on a formality standard of the signal.

According to an aspect of the present disclosure, a method implemented on a computing device having at least one processor, at least one computer-readable storage medium, and a communication platform connected to a network may include: superposing a standard beacon on a blanking line of a signal, the standard beacon including a plurality of PN sequences, marked as 0 PN sequence, 1 PN sequence, . . . , (k−1) PN sequence, k sequence, wherein k is a positive integer number, wherein every two successive PN sequences of the 0 PN sequence, the 1 PN sequence, . . . , the (k−1) PN sequence are equidistant, wherein a target distance between the (k−1) PN sequence and the k sequence is determined based on a formality standard of the signal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is a third flowchart illustrating an exemplary process for identifying a formality standard according to some embodiments of the present disclosure.

DETAILED DESCRIPTION

Figure 1:
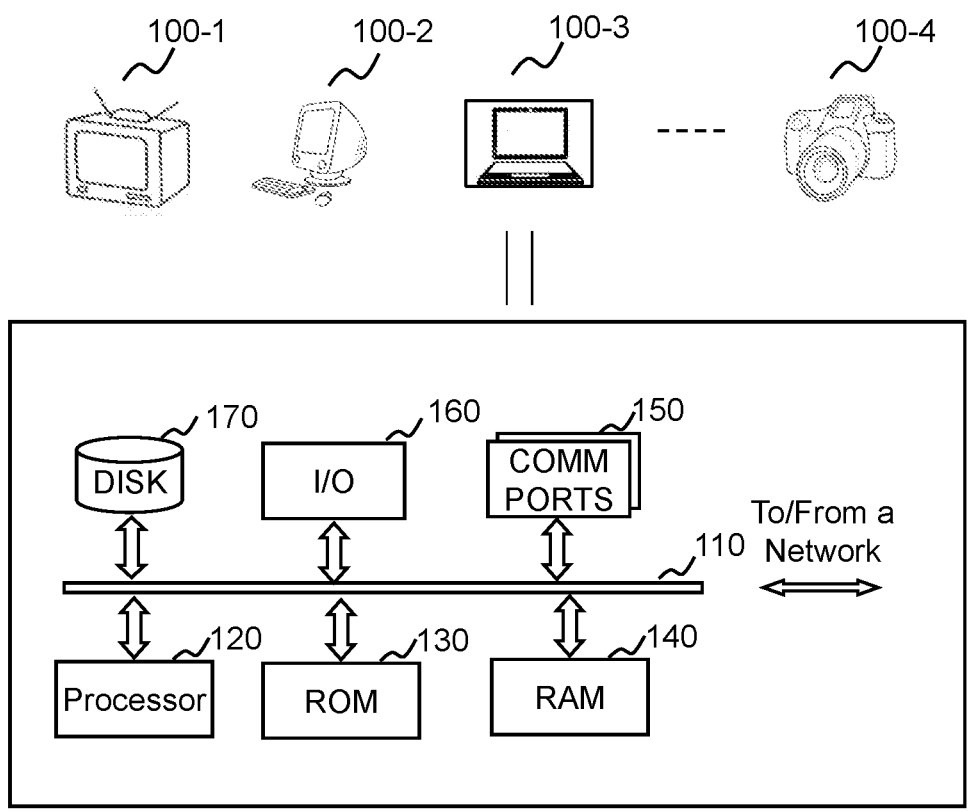
FIG. 1 is a schematic diagram illustrating an exemplary device 100 configured to generate a signal superposed with a standard beacon and/or identify a formality standard of the signal according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure provides systems and methods for identifying a formality standard of a target signal. To this end, the target signal may include a plurality of equidistant PN sequences, marked as 0 PN sequence, 1 PN sequence, . . . , (k−1) PN sequence, k sequence, wherein k is a positive integer number. The systems and methods may synchronize the target signal with a reference PN sequence to make sure the target signal is received "correctly." After the synchronization, the systems and methods may measure a distance between the last two PN sequences, i.e., the (k−1) PN sequence and the k PN sequence. Different distance values correspond to different signal formality. Thus, by obtaining the distance between the (k−1) PN sequence and the k PN sequence, the systems and the methods may identify the formality standard of the target signal.

FIG. 1 is a schematic diagram illustrating an exemplary device 100 configured to generate a signal superposed with a standard beacon and/or identify a formality standard of the signal according to some embodiments of the present disclosure. As illustrated, the device 100 may include a TV 100-1, a tablet computer 100-2, a laptop computer 100-3, and a camera 100-4.

The device 100 may include a plurality of hardware and software components. For example, the device 100 may include COM ports 150 connected to and from a network connected thereto to facilitate data communications. The device 100 may receive programming and data via network communications. As another example, the device 100 includes an I/O component 160, supporting input/output between the device 100 and other components. As still another example, the device may include an internal communication bus 110, program storage and data storage of different forms including, for example, a disk 170, and a read only memory (ROM) 130, or a random access memory (RAM) 140, for various data files to be processed and/or transmitted by the device 100. The device 100 may also include program instructions stored in the ROM 130, RAM 140, and/or other type of non-transitory storage medium to be executed by one or more processors, such as processor 120. In some embodiments, the processor 120 may include interface circuits and processing circuits therein. The interface circuits may be configured to receive electronic signals from the bus 110, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 110. In some embodiments, the processor 120 may be described as the same as descriptions associated with FIG. 8.

The methods and/or processes of the present disclosure may be implemented as the program instructions. The device 100 may be used to implement any operations described in the present disclosure. In some embodiments, the device 100 may generate a signal (e.g., a CVBS signal) superposed with a standard beacon. The standard beacon may refer to a beacon indicating a formality standard of a signal. More description regarding to the standard beacon may be found in connection with FIGS. 4 and 5. In some embodiments, the device 100 may receive a signal and identify a formality standard of the signal. For example, the device 100 may synchronize a signal with a local PN sequence. Upon determining that the signal is synchronized with local PN sequence, the device 100 may determine a standard formality of the signal.

It should be noted that the above description regarding to the device 100 is merely provided for the purposes of illustration, and not intended to limit the scope of the present disclosure. For example, the device 100 may include other computing devices, e.g., a mobile phone, a PAD, etc. As another example, the device 100 may include other components, e.g., one or more processors. Thus the device 100 may include multiple processors, and operations and/or method steps performed by one processor as described in the present disclosure may also be jointly or separately performed by the multiple processors. For example, if in the present disclosure the processor 120 of the device 100 executes both step A and step B, it should be understood that step A and step B may also be performed by two different processors jointly or separately in the device 100 (e.g., the first processor executes step A and the second processor executes step B, or the first and second processors jointly execute steps A and B).

Figure 2:
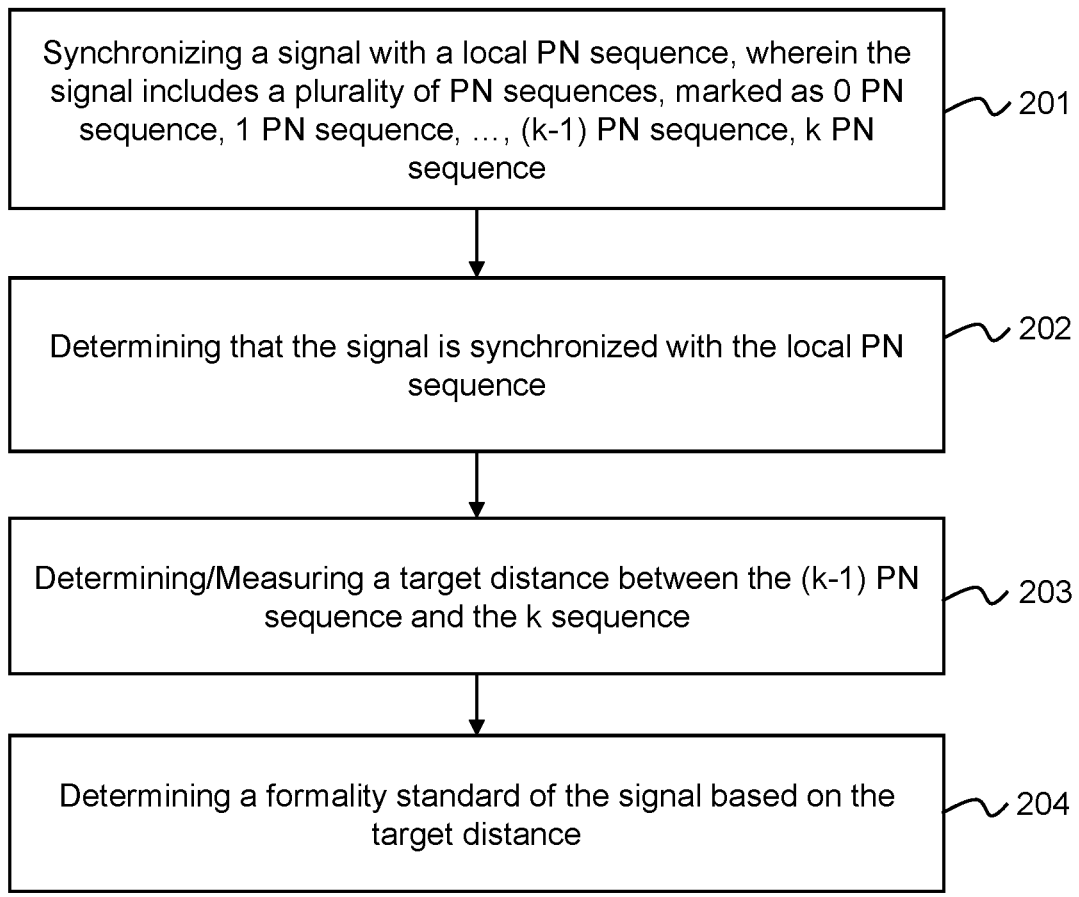
FIG. 2 is a first flowchart illustrating an exemplary process for identifying a formality standard according to some embodiments of the present disclosure.

FIG. 2 is a first flowchart illustrating an exemplary process for identifying a formality standard according to some embodiments of the present disclosure. The process 200 may be executed by the device 100. For example, the process 200 may be implemented on the processor 120. The operations of the illustrated process presented below are intended to be illustrative.

In 201, the processor 120 may synchronize a signal with a local PN sequence. The signal may be a video signal, for example, a CVBS signal. The signal may be superposed with a standard beacon. The standard beacon superposed onto the signal may be designed according to the formality standard of the signal. In other words, one standard beacon may correspond to one formality standard. In some embodiments, the standard beacon may include a plurality of PN sequences, for illustration purposes, marked as 0 PN sequence, 1 PN sequence, . . . , (k−1) PN sequence, k PN sequence in the present application. Each of the plurality of PN sequences may be the same. Theoretically, each of the plurality of PN sequences may be the same as the local PN sequence. However, in some cases, each of the plurality of PN sequences may be different from the local PN sequence. For example, when the signal is transmitted through a channel, the signal may be distorted. Thus, the PN sequence of the standard beacon superposed onto the signal may be distorted and be different from the local PN sequence.

The local PN sequence, which is not distorted, may serve as a reference used by the processor 120 to detect and/or determine whether the signal is too much distorted. If the synchronization is successful, the processor 210 may determine that the signal is substantially correctly received.

In 202, the processor 120 may detect whether the signal is synchronized with the local PN sequence. When detecting a specific condition, the processor 120 may determine the signal is synchronized with the local PN sequence. The specific condition may be set automatically or manually according to different detection methods (e.g., the peak detection method). Details regarding to the detection may be described below, for example, FIGS. 3 to 7.

As the signal is substantially correctly received, the processor may continue to conduct further performance to the signal to determine the formality standard thereof.

In 203, the processor 120 may detect and/or measure a target distance between the (k−1) PN sequence and the k PN sequence. In some embodiments, the target distance may be determined and/or measured based on maximum correlation values of the (k−1) PN sequence and the k PN sequence, which may be illustrated in connection with FIGS. 3 and 7.

In 204, the processor 120 may determine a formality standard of the signal based on the target distance. As illustrated elsewhere, the standard beacon may be designed according to the formality standard of the signal. Different standard beacons may correspond to different formality standards. Differences among different standard beacons may refer to the target distance between the (k−1) PN sequence and the k PN sequence. The relationship between the target distance and the formality standard may be determined once the standard beacon is generated and superposed onto the signal. Thus, the target distance may correspond to a unique formality standard of the signal. For example, upon determining that the target distance is 100, the processor 120 may determine the formality standard is 720P25F. As another example, upon determining that the target distance is 110, the processor 120 may determine the formality standard is 720P30F.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional steps may be added elsewhere in the exemplary process 200. For example, before operation 201, the processor 120 may design and generate a standard beacon corresponding to the signal. Further, the processor 120 may superpose the standard beacon onto the signal.

Figure 3:
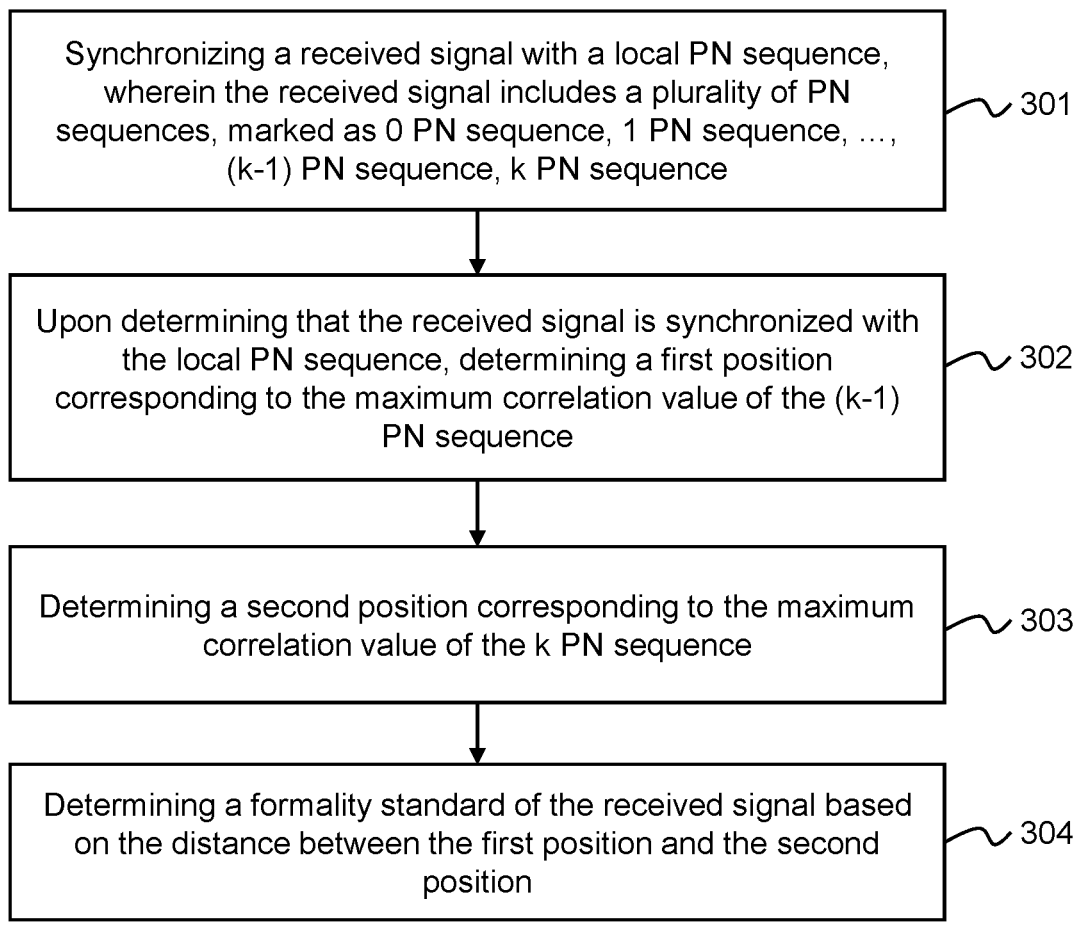
FIG. 3 is a second flowchart illustrating an exemplary process for identifying a formality standard according to some embodiments of the present disclosure.

FIG. 3 is a second flowchart illustrating an exemplary process for identifying a formality standard according to some embodiments of the present disclosure. The process 300 may be executed by the device 100. For example, the process 300 may be implemented on the processor 120. The operations of the illustrated process presented below are intended to be illustrative.

In 301, the processor 120 may synchronize a received signal with a local PN sequence. The received signal may be superposed with a standard beacon. The standard beacon may including the 0 PN sequence, the 1 PN sequence, . . . , the (k−1) PN sequence, the k PN sequence, as the same as the standard beacon illustrated in operation 201. The local PN sequence may be the same as or different from the PN sequence included in the standard beacon. In some embodiments, the standard beacon may be superposed onto the blanking lines of the received signal. More descriptions regarding to the standard beacon may be found in connection with FIGS. 4 and 5.

In 302, upon determining that the received signal is synchronized with the local PN sequence, the processor 120 may determine a first position corresponding to the maximum correlation value of the (k−1) PN sequence.

In 303, the processor 120 may determine a second position corresponding to the maximum correlation value of the k PN sequence.

In 304, the processor 120 may determine a standard of the signal based on the distance between the first position and the second position.

In the present disclosure, a PN sequence is a pseudo noise sequence, which has some statistical properties similar to random noise. In some embodiments, each PN sequence included in the standard beacon and the local PN sequence may have good autocorrelation. Thus, when the each PN sequence and the local PN sequence are the same or substantially the same (e.g., the each PN sequence may be distorted through a transmission), the each PN sequence and the local PN sequence may have good cross correlation.

In some embodiments, the processor 120 may perform cross correlation accumulation between the local PN sequence and the received signal to synchronize the received signal with the local PN sequence. Further, the processor 120 may determine a plurality of correlation values. Since the good cross correlation of PN sequences (i.e., the local PN sequence and the PN sequences included in the signal), the processor 120 may determine a plurality of maximum correlation values, each corresponding to a PN sequence included in the signal. Then, the processor 120 performed the operations 302 to 304.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional steps may be added elsewhere in the exemplary process 300. For example, before operation 301, the processor 120 may design and generate a standard beacon corresponding to the signal. Further, the processor 120 may superpose the standard beacon onto the signal.

According to the descriptions with respect to FIGS. 1 to 3, only when the signal is superposed with a standard beacon, the processor 120 may identify a formality standard of the signal. Descriptions in connection with FIG. 4 may relate to the superposition of the standard beacon onto a signal. Descriptions in connection with FIG. 5 may relate to the designation of the standard beacon.

Figure 4:
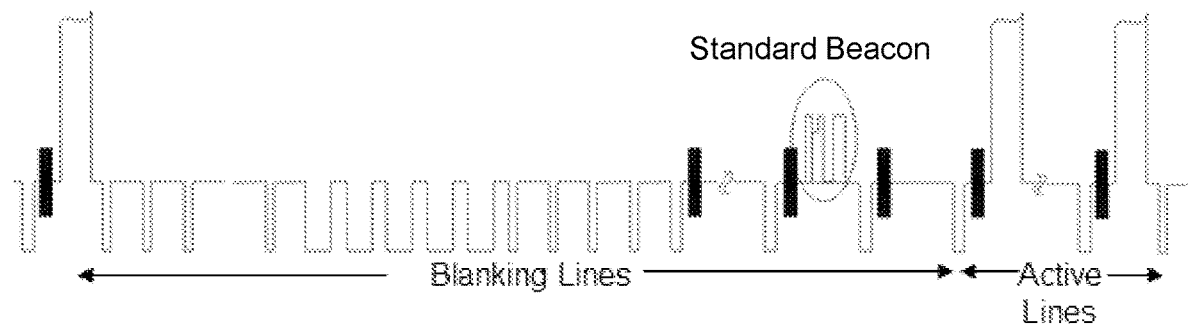
FIG. 4 is a schematic diagram illustrating an exemplary signal superposed with a standard beacon according to some embodiments of the present disclosure.

FIG. 4 is a schematic diagram illustrating an exemplary signal superposed with a standard beacon according to some embodiments of the present disclosure. As illustrated in FIG. 4, a signal may include blanking lines and active lines, and one or more standard beacons may be superposed onto the blanking lines. The one or more standard beacons may be represented by one or more black vertical bars shown in FIG. 4. The ellipse shown in FIG. 4 may represent an amplified standard beacon. The blanking lines may refer to lines in blank periods. The active lines may refer to lines except for the blanking lines, which are used to carry signal information. Due to the characteristics of the blanking lines and the active lines, the one or more standard beacons may be superposed onto the blanking lines other than the active lines. Then the superposition may not influence the synchronization of the signal. Merely by way of example, a standard beacon may be converted to the coding clock domain by sampling rate transformation, then may be superposed onto the blanking lines of the signal. Positions of the superposition and line numbers of the blanking lines may be configurable.

In some embodiments, the standard beacon may be generated according to a beacon base. The beacon base may refer to a PN sequence with good autocorrelation and cross correlation. The standard beacon may be composed of a plurality of the same beacon bases (i.e., the same PN sequences). For different formality standards, a distance between two successive PN sequences of the plurality of the same PN sequences may be different, which may be used to indicate different formality standards.

Figure 5:
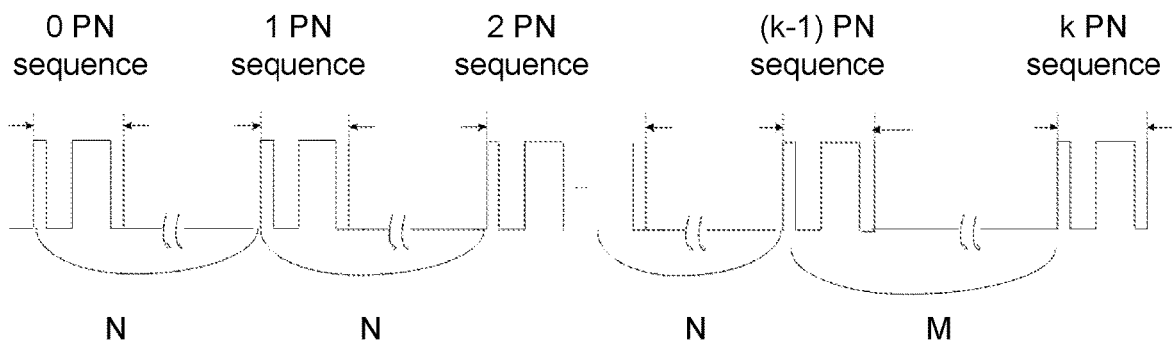
FIG. 5 is a schematic diagram illustrating an exemplary standard beacon according to some embodiments of the present disclosure.

FIG. 5 is a schematic diagram illustrating an exemplary standard beacon according to some embodiments of the present disclosure. As illustrated in FIG. 5, the standard beacon may include (K+1) PN sequences, i.e., the 0 PN sequence, the 1 PN sequence, . . . , the (k−1) PN sequence, and the k PN sequence. The top K PN sequences (i.e., the 0 PN sequence, the 1 PN sequence, . . . , and the (k−1) PN sequence) may be used for detecting the synchronization using, for example, the peak detection method. For all formality standards, a distance between any two successive PN sequences of the top K PN sequences, for example, N shown in FIG. 5, may be the same. While a distance between the (k−1) PN sequence and the k PN sequence, for example, M shown in FIG. 5, may be changed according to a formality standard of a signal to be identified. Thus, M may be used to identify the formality standard of the signal. Merely for the purposes of illustration, some examples of formality standards may be described below:

For a formality standard, 720P25F, N is 50, while M is 100.

For a formality standard, 720P30F, N is 50, while M is 110.

For a formality standard, 720P50F, N is 50, while M is 120.

For a formality standard, 720P60F, N is 50, while M is 130.

Obviously, for different formality standards, N is the same, while M is changed accordingly. A relationship between M and a formality standard is predetermined. Thus, M, i.e., the distance between the (k−1) PN sequence and the k PN sequence may indicate the formality standard of a signal.

In some embodiments, the processor 120 may detect the synchronization of the signal with the local PN sequence using the peak detection method. Particularly, the processor 120 may detect the synchronization of the top K PN sequences and the local PN sequence. Merely by way of example, the processor 120 may perform cross correlation accumulation between the local PN sequence and the signal, and obtain a plurality of correlation values. The processor 120 may divide the plurality of correlation values evenly using a plurality of windows, for example, a plurality of windows N shown in FIG. 6. The length of the window N may be the same as a distance between any two successive PN sequences of the top K PN sequences. Thus, each window N may correspond to a PN sequence included in the signal. Further, for each window N, the processor 120 may compare the correlation values, and determine the maximum correlation value and the relative position thereof. As used in the present disclosure, the relative position of a maximum correlation value may refer to a position based on the window N as a reference.

Upon determining relative positions of maximum correlation values of top K windows (i.e., K windows N corresponding to the top K PN sequences) are the same, the processor 120 may determine that the synchronization may be completed.

In order to make the detection of the synchronization more reliable, the processor 120 may further conduct one more operations. For example, the processor 120 may determine whether differences between maximum correlation values of top L windows are less than a threshold. Upon determining that the differences between maximum correlation values of the top L windows are less than the threshold, the processor 120 may determine that the synchronization may be completed. The threshold may be small, indicating that maximum correlation values of the top L windows are substantially the same. It should be noted that the one more operations may be conducted based on a property of a line superposed with the formality beacon. The property may be that, for each of the top L windows, correlation values except for those corresponding to PN sequences on the line are small. Thus, the maximum correlation values of the top L windows may correspond to the PN sequences. If the synchronization is completed, due to the good autocorrelation of the PN sequences, the maximum correlation values of the PN sequences should be substantially the same. L may refer to a positive integer number less than K, for example, (K−1), (K−2), etc.

After the signal is synchronized with the local PN sequence, the processor 120 may determine a correlation value of the k PN sequence. The processor 120 may further determine whether the correlation value of the k PN sequence is within a range. Upon determining that the correlation value of the k PN sequence is within the range, the processor 120 may determine the correlation value of the k PN sequence as the maximum correlation value of the k PN sequence. Then, the processor 120 may determine the formality standard of the signal based on a distance between maximum correlation values of the (k−1) PN sequence and the k PN sequence. In some embodiments, the range may be determined based on maximum correlation values of the top K PN sequence (i.e., the K windows corresponding to the top K PN sequences). For example, the range may be determined based on the average of the maximum correlation values of the top K PN sequence.

To facilitate describing the process 300 for identifying a formality standard of a signal, process 700 may be illustrated below. It should be noted that the process 700 is merely an example of the process 300 and is not intended to be limiting.

FIG. 7 is a third flowchart illustrating an exemplary process for identifying a formality standard according to some embodiments of the present disclosure. The process 700 may be executed by the device 100. For example, the process 700 may be implemented on the processor 120. The operations of the illustrated process presented below are intended to be illustrative.

In 701, the processor 120 may perform cross correlation accumulation on a signal and a local PN sequence, and obtain a plurality of correlation values marked as pn_relate_add. The signal may be a Composite Video Broadcast Signal (CVBS). The cross correlation may refer to a degree of correlation between two random signals, for example, the signal and the local PN sequence. As illustrated in FIG. 3, the signal may be superposed with a formality beacon including a plurality of PN sequences, marked as 0 PN sequence, 1 PN sequence, . . . , (k−1) PN sequence, k PN sequence. Particularly, the processor 120 may perform cross correlation accumulation on the formality beacon and the local PN sequence. Accordingly, the processor 120 may obtain a plurality of correlation values corresponding to the plurality of PN sequences.

In some embodiments, the cross correlation accumulation may include processing the signal with a filter. The coefficients of the filter may be determined based on the plurality of PN sequences.

In 702, the processor 120 may divide the plurality of correlation values pn_relate_add using a plurality of windows. Each of the plurality of windows may correspond to a PN sequence of the formality beacon superposed onto the signal. For each of the plurality of windows, the processor 120 may determine the maximum correlation value and a relative position corresponding to the maximum correlation value. In some embodiments, the window may be the window N shown in FIG. 6. In some embodiments, the length of the window may be set according to the length of a PN sequence (e.g., the 0 PN sequence, the 1 PN sequence, . . . , the (k−1) PN sequence). For example, the length of the window may be the same as the length of the PN sequence. At the same time, the length of the window may be limited by the length of the signal.

In 703, the processor 120 may determine whether relative positions corresponding to the maximum correlation values of K successive windows are identical. As used herein, the K successive windows may refer to K successive windows corresponding to the 0 PN sequence, the 1 PN sequence, . . . , and the (k−1) PN sequence. If the relative positions corresponding to the maximum correlation values of the K successive windows are identical, the processor 120 may determine that the signal is synchronized with the local PN sequence. After the synchronization, the processor 120 may further determine the maximum correlation value of the (k−1) PN sequence and the relative position thereof. At this moment, the maximum correlation value of the (k−1) PN sequence may be marked as max_compare.

It should be noted that, in some embodiments, the relative positions corresponding to the maximum correlation values of the K successive windows may not be identical. For example, if the noise interference is greater during the transmission of the signal, the positions corresponding to the maximum correlation values of the K successive windows may not be identical. Thus, the signal may not be synchronized with the local PN sequence. On one hand, upon determining that the signal is not synchronized with the local PN sequence, the process 700 may still proceed to operation 704 to identify the standard of the signal. On the other hand, the possibility of failing the synchronization is very low. Merely by way of example, for a 500-meter long transmission, about one time of ten times synchronization may fail. However, for a formality standard, e.g., 720P25F, about twenty times synchronization may be conducted every one-meter long transmission.

In 704, the processor 120 may determine a correlation value of the k PN sequence, and further determine whether the correlation value of the k PN sequence is within a range. The correlation value of the k PN sequence may refer to the maximum value of correlation values corresponding to the k PN sequence. If the correlation value of the k PN sequence is within the range, the processor 120 may further determine the correlation value as the maximum correlation value of the k PN sequence and determine a relative position corresponding to the maximum correlation value of the k PN sequence. In some embodiments, the range may be set according to the noise interference and the maximum correlation values of the top K PN sequences (e.g., the (k−1) PN sequence). For example, if the noise interference is small or even does not exist, the range may be narrow, e.g., from the max_compare to the max_compare. Thus, the maximum correlation value of the k PN sequence may be the same as the maximum correlation value of the (k−1) PN sequence. As another example, if the noise interference is greater, the range may be wide, as illustrated below:

$$\tfrac{3}{4}*\text{max\_compare} < pn\_relate\_add < \tfrac{4}{3}*\text{max\_compare}$$

wherein the max_compare represents the maximum correlation value of the (k−1) PN sequence, and the pn_relate_add represents correlation values corresponding to the k PN sequence after the signal is synchronized with the local PN sequence.

In 705, the processor 120 may determine a target distance between the (k−1) PN sequence and the k PN sequence. The target distance may be determined based on the relative positions of the (k−1) PN sequence and the k PN sequence.

In 706, the processor 120 may determine a formality standard of the signal based on the target distance. As illustrated elsewhere, a distance between the (k−1) PN sequence and the k PN sequence is predetermined according to different formality standards. Then, the processor 120 may determine the formality standard of the signal based on the target distance. Merely by way of example, for a formality standard, for example, 720P60F, assume that the distance between the (k−1) PN sequence and the k PN sequence is 130. Upon determining the target distance is 130 or approximately 130 (e.g., 129, 131, etc.), the processor may determine the formality standard of the signal is 720P60F.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional steps may be added elsewhere in the exemplary process 700. For example, after the synchronization, the processor 120 may determine a period of the signal. Further, the processor 120 may determine the formality standard of the signal based on the period.

Figure 8:
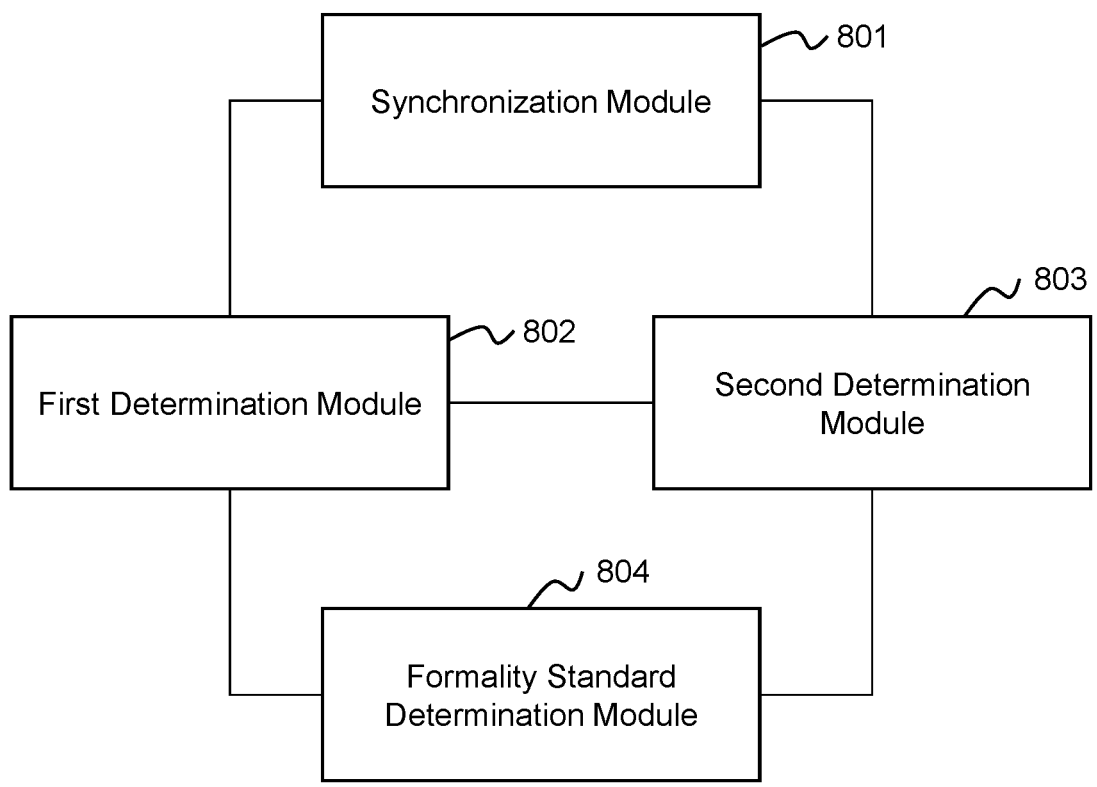
FIG. 8 is a schematic diagram illustrating an exemplary processor configured to determine a formality standard according to some embodiments of the present disclosure.

FIG. 8 is a schematic diagram illustrating an exemplary processor 120 configured to determine a formality standard according to some embodiments of the present disclosure. The processor 120 may include a synchronization module 801, a first determination module 802, a second determination module 803, and a standard determination module 804.

The synchronization module 801 may be configured to synchronize a received signal with a local PN sequence. A standard beacon may be superposed onto the received signal. The standard beacon may be composed of a plurality of PN sequences, marked as 0 PN sequence, 1 PN sequence, ..., (k−1) PN sequence, k PN sequence. As illustrated elsewhere, the 0 PN sequence, the 1 PN sequence, ..., and the (k−1) PN sequence may be used to synchronize the received signal with the local PN sequence, while the (k−1) PN sequence and the k PN sequence may be used to identify a formality standard of the received signal. Further, the synchronization module 801 may determine whether the received signal is synchronized with the local PN sequence. Details regarding to the determination may be found in connection with FIG. 7.

The first determination module 802 may be configured to determine the maximum correlation value of the (k−1) PN sequence. In some embodiments, the first determination module 802 may determine the maximum correlation value of the (k−1) PN sequence after the received signal is synchronized with the local PN sequence.

The second determination module 803 may be configured to determine the maximum correlation value of the k PN sequence. In some embodiments, the second determination module 803 may determine the maximum correlation value of the k PN sequence, after the received signal is synchronized with the local PN sequence.

The standard determination module 804 may be configured to determine a formality standard of the received signal. In some embodiments, the standard determination module 804 may determine the formality standard based on a distance between the maximum correlation value of the (k−1) PN sequence and the maximum correlation value of the k PN sequence.

In some embodiments, the synchronization module 801 may perform cross correlation accumulation between the local PN sequence and the received signal, and obtain a plurality of correlation values.

In some embodiments, upon determining that relative positions of maximum correlation values of N successive PN sequences are the same, the synchronization module 801 may determine that the received signal is synchronized with the local PN sequence. The N may be a positive integer number. The N may be not greater than (k−1), for example, (k−1).

Figure 6:
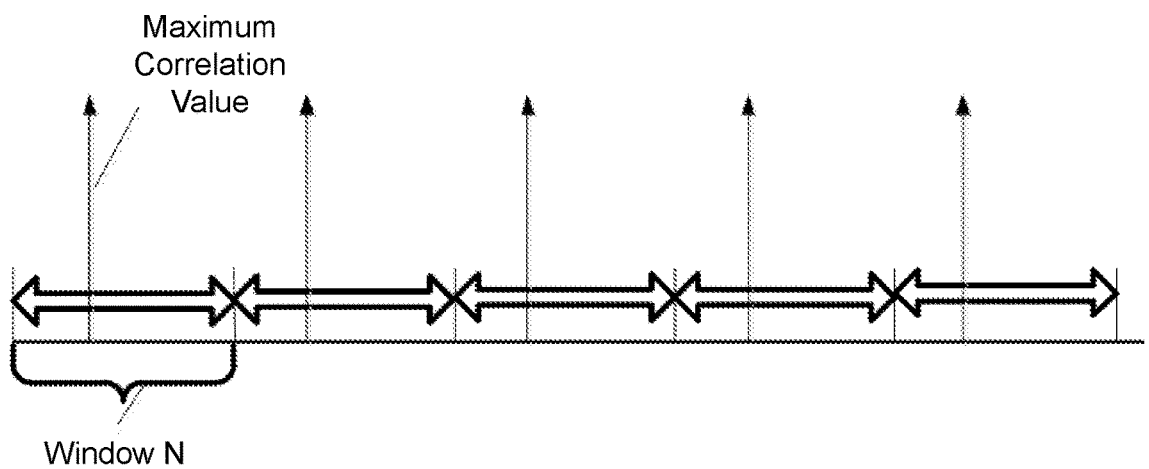
FIG. 6 is a schematic diagram illustrating an exemplary peak detection method according to some embodiments of the present disclosure.

In some embodiments, to determine that relative positions of maximum correlation values of the N successive PN sequences are the same, the synchronization module 801 may divide the received signal using a window (e.g., window N illustrated in FIG. 6). The length of the window may be determined based on the length of the PN sequences (e.g., the 0 PN sequence, the 1 PN sequence, ..., the (k−1) PN sequence, the k PN sequence). Thus, each of the 0 PN sequence, the 1 PN sequence, ..., the (k−1) PN sequence, and the k PN sequence may correspond to a window. Then, the synchronization module 801 may determine the maximum correlation value of each window and a relative position thereof. Upon determining relative positions of maximum correlation values of K successive windows (i.e., K windows corresponding to the 0 PN sequence, the 1 PN sequence, ..., the (k−1) PN sequence) are the same, the synchronization module 801 may determine that the received signal is synchronized with the local PN sequence.

In some embodiments, to determine the maximum correlation value of the k PN sequence, the second determination module 803 may determine whether the maximum correlation value between the received signal and the local PN sequence is within a range. As used herein, the maximum correlation value may be determined after the received signal is synchronized with the local PN sequence. The range may be set as the same as descriptions illustrated in FIG. 7.

Further, in order to make the determination of the formality standard more reliable, the processor 120 may identify the formality standard several times. For a frame of the received signal that includes more than one standard beacons, the processor 120 may conduct the identification more than once. While for a frame of the received signal that includes only one standard beacon, the processor 120 may conduct the identification only once. Accordingly, using a frame including more than one standard beacons, the processor 120 may complete the determination efficiently. Merely by way of example, assume that the processor 120 may determine a reliable formality standard by identifying the formality standard five times. For a fame including five standard beacons, the processor 120 may identify the formality standard five times, i.e., the processor 120 may determine the reliable formality standard using only one frame. Thus, to accelerate the efficiency of determining the formality standard, a frame of the received signal may be superposed with more than one standard beacons.

Further, the processor 120 may eliminate an influence of sampling phase offset on the standard beacon. For example, the processor 120 may assume the received signal as equation (1), as illustrated below:

$$r_i = c_i e^{j(\Delta\theta)} + n_i, \quad (1)$$

wherein, $r_i$ may represent the ith received signal, $c_i$ may represent the ith original signal before a transmission, $\Delta\theta$ may represent a carrier frequency offset in the transmission, $j$ may present an imaginary part of $\Delta\theta$, and $n_i$ may represent the noise in the transmission of the ith original signal.

According to equation (1), cross correlation may be illustrated as equation (2):

$$r^*_{i+n} c_i = c^*_{i+n} c_i e^{j(\Delta\theta)} + n_i c^*_i, \quad (2)$$

wherein, $r^*_{i+n}$ may represent the complex conjugate of the (i+n)th received signal, $c^*_{i+n}$ may represent the complex conjugate of the (i+n)th original signal, and $c^*_i$ may represent the complex conjugate of the ith original signal before the transmission.

According to equations (1) and (2), $e^{j(\Delta\theta)}$ may be constant, and the modulus of $e^{j(\Delta\theta)}$ is 1. The processor 120 may eliminate the phase offset through a modulus operation.

The modules in the processor 120 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the first determination module 802 and the second determination module 803 may be combined as a single module which may both determine the maximum correlation values of the (k−1) PN sequence and the k PN sequence. As another example, the processor 120 may include a storage module storing, e.g., the local PN sequence, the identified formality standard.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
    a storage device storing a set of instructions; and
    one or more processors in communication with the storage device, wherein when executing the set of instructions, the one or more processors are directed to cause the system to:
        synchronize a signal using Pseudorandom Noise (PN) sequences, wherein the signal includes a plurality of PN sequences, marked as 0 PN sequence, 1 PN sequence, . . . , (k−1) PN sequence, k PN sequence, wherein k is a positive integer number;
        determine whether the signal is synchronized using the PN sequences;
        in response to that the signal is synchronized, determine a first position corresponding to a first maximum correlation value of the (k−1) PN sequence;
        determine a second position corresponding to a second maximum correlation value of the k PN sequence, wherein the second maximum correlation value of the k PN sequence is within a range, wherein the range is determined based on maximum correlation values of the 0 PN sequence, the 1 PN sequence, . . . , and the (k−1) PN sequence;
        determine a distance between the (k−1) PN sequence and the k PN sequence; and
        determine a formality standard of the signal based on the distance between the (k−1) PN sequence and the k PN sequence.

2. The system of claim 1, wherein every two successive PN sequences of the 0 PN sequence, the 1 PN sequence, . . . , the (k−1) PN sequence are equidistant.

3. The system of claim 1, wherein to synchronize the signal with using the PN sequences, the one or more processors are directed to cause the system to:
    perform cross correlation accumulation on the signal;
    obtain correlation values of the 0 PN sequence, the 1 PN sequence, . . . , and the (k−1) PN sequence based on the cross correlation accumulation; and
    synchronize the signal based on the correlation values.

4. The system of claim 1, wherein to determine whether the signal is synchronized using the PN sequences, the one or more processors are directed to cause the system to:
    determine whether relative positions corresponding to maximum correlation values of at least two successive PN sequences of the 0 PN sequence, the 1 PN sequence, . . . , and the (k−1) PN sequence are identical; and upon determining that relative positions corresponding to maximum correlation values of at least two successive PN sequences are identical, determine that the signal is synchronized.

5. The system of claim 4, wherein to determine whether relative positions corresponding to maximum correlation values of at least two successive PN sequences of the 0 PN sequence, the 1 PN sequence, . . . , and the (k−1) PN sequence are identical, the one or more processors are directed to cause the system to:

divide correlation values of the 0 PN sequence, the 1 PN sequence, . . . , and the (k−1) PN sequence using a plurality of windows;

for each of the plurality of windows, determine a third maximum correlation value;

determine a relative position corresponding to the third maximum correlation value; and determine whether at least two of the relative positions corresponding to the third maximum correlation values in the plurality of windows are identical.

6. The system of claim 5, wherein for each of the plurality of windows, a window length is determined based on a distance between two successive PN sequences of the 0 PN sequence, the 1 PN sequence, . . . , and the (k−1) PN sequence.

7. The system of claim 5, wherein to determine whether the signal is synchronized, the one or more processors are directed to cause the system further to:

determine whether differences among at least two of the third maximum correlation values in the plurality of windows are less than a threshold; and upon determining that the differences among at least two of the third maximum correlation values are less than the threshold, determine that the signal is synchronized.

8. A method, comprising:

synchronizing a signal using Pseudorandom Noise (PN) sequences, wherein the signal includes a plurality of PN sequences, marked as 0 PN sequence, 1 PN sequence, . . . , (k−1) PN sequence, k PN sequence, wherein k is a positive integer number;

determining whether the signal is synchronized using the PN sequences;

in response to that the signal is synchronized, determining a first position corresponding to a first maximum correlation value of the (k−1) PN sequence;

determining a second position corresponding to a second maximum correlation value of the k PN sequence, wherein the second maximum correlation value of the k PN sequence is within a range, wherein the range is determined based on maximum correlation values of the 0 PN sequence, the 1 PN sequence, . . . , and the (k−1) PN sequence;

determining a distance between the (k−1) PN sequence and the k PN sequence; and determining a formality standard of the signal based on the distance between the (k−1) PN sequence and the k PN sequence.

9. The method of claim 8, wherein every two successive PN sequences of the 0 PN sequence, the 1 PN sequence, . . . , the (k−1) PN sequence are equidistant.

10. The method of claim 8, wherein the synchronizing the signal with using the PN sequences includes:

performing cross correlation accumulation on the signal;

obtaining correlation values of the 0 PN sequence, the 1 PN sequence, . . . , and the (k−1) PN sequence based on the cross correlation accumulation; and synchronizing the signal based on the correlation values.

11. The method of claim 8, wherein the determining whether the signal is synchronized using the PN sequences includes:

determining whether relative positions corresponding to maximum correlation values of at least two successive PN sequences of the 0 PN sequence, the 1 PN sequence, . . . , and the (k−1) PN sequence are identical; and upon determining that relative positions corresponding to maximum correlation values of at least two successive PN sequences are identical, determining that the signal is synchronized.

12. The method of claim 11, wherein the determining whether relative positions corresponding to maximum correlation values of at least two successive PN sequences of the 0 PN sequence, the 1 PN sequence, . . . , and the (k−1) PN sequence are identical includes:

dividing correlation values of the 0 PN sequence, the 1 PN sequence, . . . , and the (k−1) PN sequence using a plurality of windows;

for each of the plurality of windows, determining a third maximum correlation value;

determining a relative position corresponding to the third maximum correlation value; and determining whether at least two of the relative positions corresponding to the third maximum correlation values in the plurality of windows are identical.

13. The method of claim 12, wherein for each of the plurality of windows, a window length is determined based on a distance between two successive PN sequences of the 0 PN sequence, the 1 PN sequence, . . . , and the (k−1) PN sequence.

14. The method of claim 12, wherein the determining whether the signal is synchronized includes:

determining whether differences among at least two of the third maximum correlation values in the plurality of windows are less than a threshold; and upon determining that the differences among at least two of the third maximum correlation values are less than the threshold, determining that the signal is synchronized.

15. A non-transitory computer readable medium, comprising a set of instructions, wherein when executed by a processor, the set of instructions direct the processor to perform a method, the method comprising:

synchronizing a signal using Pseudorandom Noise (PN) sequences, wherein the signal includes a plurality of PN sequences, marked as 0 PN sequence, 1 PN sequence, . . . , (k−1) PN sequence, k PN sequence, wherein k is a positive integer number;

determining whether the signal is synchronized using the PN sequences;

in response to that the signal is synchronized, determining a first position corresponding to a first maximum correlation value of the (k−1) PN sequence;

determining a second position corresponding to a second maximum correlation value of the k PN sequence, wherein the second maximum correlation value of the k PN sequence is within a range, wherein the range is determined based on maximum correlation values of the 0 PN sequence, the 1 PN sequence, . . . , and the (k−1) PN sequence;

determining a distance between the (k−1) PN sequence and the k PN sequence; and determining a formality standard of the signal based on the distance between the (k−1) PN sequence and the k PN sequence.

16. The non-transitory computer readable medium of claim 15, wherein every two successive PN sequences of the 0 PN sequence, the 1 PN sequence, . . . , the (k−1) PN sequence are equidistant.

17. The non-transitory computer readable medium of claim 15, wherein the synchronizing the signal with using the PN sequences includes:

performing cross correlation accumulation on the signal;

obtaining correlation values of the 0 PN sequence, the 1 PN sequence, . . . , and the (k−1) PN sequence based on the cross correlation accumulation; and synchronizing the signal based on the correlation values.

18. The non-transitory computer readable medium of claim 15, wherein the determining whether the signal is synchronized using the PN sequences includes:

determining whether relative positions corresponding to maximum correlation values of at least two successive PN sequences of the 0 PN sequence, the 1 PN sequence, . . . , and the (k−1) PN sequence are identical; and upon determining that relative positions corresponding to maximum correlation values of at least two successive PN sequences are identical, determining that the signal is synchronized.

19. The non-transitory computer readable medium of claim 18, wherein the determining whether relative positions corresponding to maximum correlation values of at least two successive PN sequences of the 0 PN sequence, the 1 PN sequence, . . . , and the (k−1) PN sequence are identical includes:

dividing correlation values of the 0 PN sequence, the 1 PN sequence, . . . , and the (k−1) PN sequence using a plurality of windows;

for each of the plurality of windows, determining a third maximum correlation value;

determining a relative position corresponding to the third maximum correlation value; and determining whether at least two of the relative positions corresponding to the third maximum correlation values in the plurality of windows are identical.

20. The non-transitory computer readable medium of claim 19, wherein for each of the plurality of windows, a window length is determined based on a distance between two successive PN sequences of the 0 PN sequence, the 1 PN sequence, . . . , and the (k−1) PN sequence.

* * * * *